United States Patent [19]
Hult

[11] 3,760,209
[45] Sept. 18, 1973

[54] SPLIT END BELL FOR MOTOR HOUSING

[75] Inventor: David R. Hult, Columbus, Ind.

[73] Assignee: Vernco Corporation, Columbus, Ind.

[22] Filed: May 25, 1972

[21] Appl. No.: 256,905

[52] U.S. Cl.................... 310/91, 310/89, 310/90
[51] Int. Cl. ............................................ H02k 5/00
[58] Field of Search .................. 310/90, 91, 89, 85, 310/88, 42, 43, 45, 40 MM, 71

[56] References Cited
UNITED STATES PATENTS

| | | | |
|---|---|---|---|
| 3,450,907 | 6/1969 | Blume | 310/42 |
| 3,603,824 | 9/1971 | Csaki | 310/71 |
| 2,798,995 | 7/1957 | McLean | 310/43 |
| 3,378,709 | 4/1968 | Royer | 310/90 |
| 3,593,049 | 7/1971 | Dittrich | 310/91 |
| 3,145,313 | 8/1964 | Tupper | 310/90 |

FOREIGN PATENTS OR APPLICATIONS 1,078,678  3/1960  Germany .................... 310/40 MM

*Primary Examiner*—R. Skudy
*Attorney*—William R. Coffey

[57] ABSTRACT

A motor comprising a rotor assembly including an elongated shaft and an armature assembly mounted on the shaft intermediate its ends, stator elements disposed about the armature assembly, and a housing including an axially extending cylindrical shell enclosing the stator elements and end bells for closing each end of the shell and journal mounting the shaft. Each end bell is a 2-piece end bell including a peripherally extending axially inner piece and a mating peripherally extending axially outer piece. The end bell pieces, which are preferably made of plastic, capture and support the bearings for the shaft, hold the commutator brushes and position the stator elements.

17 Claims, 4 Drawing Figures

PATENTED SEP 18 1973 3,760,209

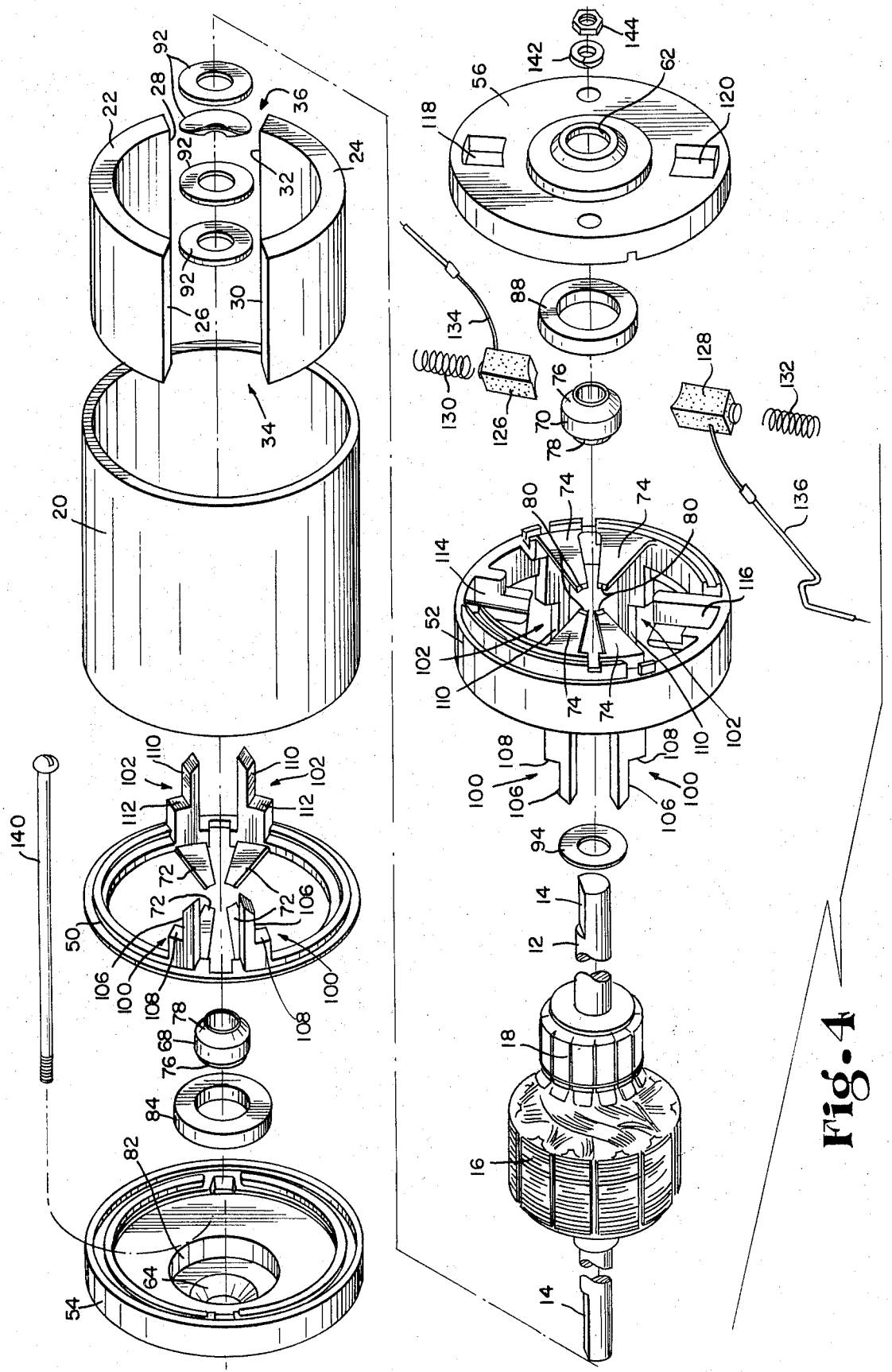

SPLIT END BELL FOR MOTOR HOUSING

It is a primary object of the present invention to provide a motor comprising a housing, the elements of which include a cylindrical shell and end bell means closing each end of the shell and journal mounting the shaft on which the armature assembly is mounted, each end bell means including a peripherally extending axially inner piece engaging the adjacent end of the shell and a mating peripherally extending axially outer piece. The ends of the cylindrical shell lie in planes perpendicular to the axis of the shaft, and each outer piece engages its mating inner piece along a plane perpendicular to the axis of the shaft. Each end bell means, therefore, is split along a plane generally perpendicular to the axis of the motor. It will be appreciated that, conventionally, if end bells for motors are split, they are split along planes parallel to the axis of the motor and often along planes which include the axis of the motor.

Each end bell means of the present invention is proportioned and designed such that one of its said pieces, i.e., its axially inner or axially outer piece, provides a concentric seat for one axial end of a bearing which supports the shaft and the other of its said pieces provides radially inwardly extending portions for engaging the axially opposite end of the bearing and holding the bearing in the seat. Such radially inwardly extending portions may preferably be yieldable slightly in the axial direction.

The motor of the present invention preferably includes a pair of rubber-like stator members which are impregnated with magnetic material. The stator members are cylindrically formed to extend about opposite portions of the armature assembly. The axially inner pieces of the end bell means include axially inwardly extending finger portions which engage the stator elements to hold them in their proper positions against the internal wall of the housing shell and about the armature assembly.

One of the said end bell means is proportioned and designed such that one of its pieces provides a pair of generally radially inwardly extending slots and the other of its pieces provides generally radially extending covers for the slots. The armature assembly includes a commutator in registry with the slots, and brushes are disposed respectively in the slots for generally radial reciprocation therein. Spring means are provided for urging the brushes inwardly to contact the commutator.

It will be appreciated, therefore, that the housing of the motor of the present invention, including the plastic end bells which are split along planes which are perpendicular to the axis of the motor, i.e., perpendicular to the axis of the shaft on which the armature assembly is concentrically mounted, provides many great advantages. First of all, the time required to assemble the motor is significantly reduced because the parts of each end bell are proportioned and designed to facilitate the assembly operation. The end bell pieces are proportioned and designed quickly to position and preload the bearings which rotatably support the motor shaft, quickly to position and hold the stator elements relative to the armature assembly, and quickly to position the commutator brushes for engagement of the commutator.

It will further be appreciated that the manufacture and sale of small motors is an extremely competitive business. Every effort must be made to provide a motor of good quality while keeping the cost of the motor to an absolute minimum. The motor of the present invention certainly meets that objective because it is constructed such that the time required to assemble the motor can be held to an absolute minimum, thereby reducing the labor cost in the motor. Additionally, the end bell pieces are made in finished form from relatively inexpensive plastic and using inexpensive plastic molding techniques.

It is an object of the present invention, therefore, to provide a motor which is inexpensive yet effective for the purpose intended.

Other objects and features of the present invention will become apparent as this description progresses.

To the accomplishment of the above and related objects, this invention may be embodied in the form illustrated in the accompanying drawings, attention being called to the fact, however, that the drawings are illustrative only, and that change may be made in the specific construction illustrated and described, so long as the scope of the appended claims is not violated.

In the drawings:

FIG. 4 is an exploded perspective view of the motor of the present invention.

Figure 1:
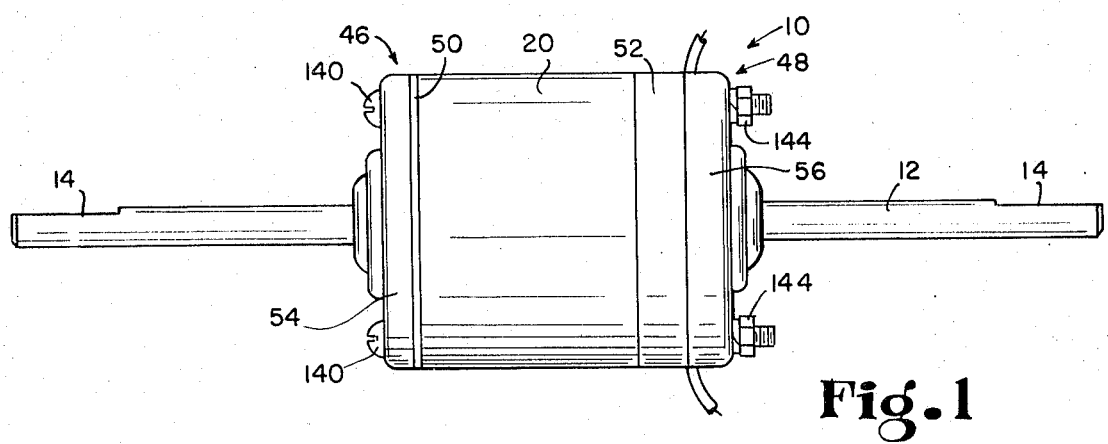
FIG. 1 is a plan view of the motor of the present invention.
Figure 2:
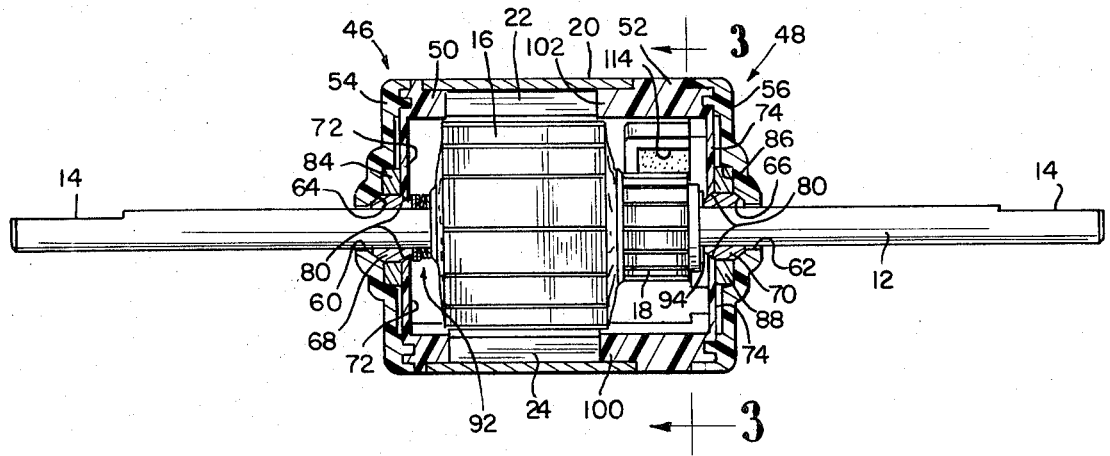
FIG. 2 is a sectional view of the motor of the present invention taken along an axial plane.

Referring now particularly to the drawings, it will be seen that there is illustrated a motor 10 comprising a rotor assembly including an elongated shaft 12 having flats 14 at its opposite ends and an armature assembly 16 mounted on the shaft intermediate its ends, the armature assembly including a commutator 18 conventionally providing a plurality of peripherally spaced contact segments to be contacted by brushes.

It will be seen that the armature assembly 16 is disposed inside a cylindrical shell 20 which is concentric with the axis of the shaft 12. In the illustrative embodiment, the stator means includes a pair of cylindrically formed stator members 22, 24 which are preferably formed or molded of rubber or rubberlike material which is impregnated with magnetic material. Rubber or rubberlike stator elements impregnated with magnetic material are well known.

Each stator member 22, 24 extends about less than 180° of the periphery of the armature assembly 16 such that the axially extending edges 26, 28, 30, 32 of the members define two radially oppositely disposed, axially extending spaces 34, 36 adjacent the internal wall of the shell 20. The reasons for these spaces 34, 36 will become apparent as this description progresses.

As stated previously, the motor 10 includes end bell means 46, 48 closing the opposite ends of the shell 20 and journal mounting the shaft 12. It will be seen that the ends of the shell 20 lie in planes perpendicular to the axis of the shaft 12. It will also be seen that each end bell means 46, 48 includes a peripherally extending axially inner piece 50, 52 and a peripherally extending axially outer mating piece 54, 56. The outer pieces 54, 56 are provided with concentric bores 60, 62 through which the shaft 12 extends and axially inwardly facing and concentrically conically tapered seats 64, 66 surrounding their bores 60, 62. These seats 64, 66 are for the shaft bearings 68, 70, which may be conventional oil-impregnated bearings. Each of the axially inner pieces 50, 52 is formed to provide radially inwardly extending fingers 72, 74 for engaging the associated bearing 68, 70 and holding it in its seat 64, 66. The fingers 72, 74 may preferably be slightly axially yieldable so that the fingers may deflect as required. It will be appreciated that the fingers 72, 74 serve to preload the bearings 68, 70.

Each of the bearings 68, 70, in the illustrative embodiment, has a generally cylindrically shaped central portion with one of its ends 76 beveled conformingly to fit its seat 64, 66 and the other of its ends 78 similarly beveled. It will be appreciated that the radially inner ends of the fingers 72, 74 are beveled as indicated at 80 conformingly to rest against the beveled ends 78 of the bearings. Further, in the illustrative embodiment, the outer piece 54 is provided with a concentric, cylindrical cavity 82 which receives a ring 84, the internal diameter of which receives the cylindrical portion of the bearing 68. Similarly, the outer piece 56 has such a cavity 86 receiving a ring 88 which in turn receives the cylindrical portion of the bearing 70.

The bearings 68, 70 for the shaft 12 are therefore securely positioned and held between the inner and outer pieces of the end bell means 46, 48, respectively.

Conventionally, and in the illustrative embodiment, washers 92, including a spring washer, are provided between the bearing 68 and the armature assembly while another washer 94 is provided between the commutator and the bearing 70.

The axially inner pieces 50, 52 each provide two radially oppositely disposed pairs of fingers 100, 102 extending respectively axially inwardly into the adjacent end of the spaces 34, 36, each pair of said fingers being peripherally spaced apart as illustrated to engage respectively the opposing axially extending edges 26, 30 and 28, 32 of the stator members 22, 24. The fingers 100, 102 serve to maintain the spaces 34, 36 to keep the stator members 22, 24 against the inner periphery of the shell 20. The fingers 100 are provided with axially extending surfaces 106 which engage respectively the edges 26, 30 to position those edges and radially extending surfaces 108 which engage the ends of the stator members 22, 24 axially to position the stator members. Similarly, the fingers 102 are provided with axially extending surfaces 110 for engaging the edges 28, 32 and radially extending surfaces 112 for engaging the opposite ends of the stator members 22, 24. The axially inner ends of the fingers 100, 102 are beveled as illustrated to facilitate insertion of the fingers into the spaces 34, 36.

The inner piece 52 is formed to provide a pair of generally radially inwardly extending slots 114, 116 having generally rectangular cross sections while the outer piece 56 is formed to provide a pair of generally radially extending covers 118, 120 for the slots. In the view of FIG. 4, the outer surface of the piece 56 is shown with generally radially oppositely disposed depressions. It is the floors of these depressions which provide the covers 118, 120. That is, the axially inwardly facing surfaces of the floors of the two depressions clearly shown in FIG. 4 are in registry with the open sides of the slots 114, 116 to cover those slots when the two pieces 52, 56 are brought together.

The commutator 18 is in registry with the slots 114, 116, and the slots are open at their radially inner ends so that commutator brushes 126, 128 which are disposed in the slots can ride against the commutator. Springs, such as indicated at 130, 132, are provided for urging the brushes radially inwardly against the commutator. It will be appreciated that the brushes 126, 128 have a generally rectangular cross section which fits into the cross section of the slots 114, 116, the covers 118, 120 keep the brushes in the slots. Wires 134, 136 provide the electrical connections to the brushes.

Figure 3:
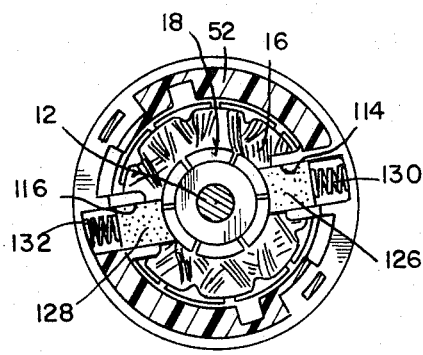
FIG. 3 is a sectional view taken along the lines 3—in FIG. 2.

It will be noted above that the slots 114, 116 are said to be generally radially extending. The reason for this is that the slots need not be perfectly radially extending and may be slightly offset as clearly shown in FIG. 3.

Finally, the motor 10 may be held together by fastening means such as the illustrated screws 140, washers 142 and nuts 144, the screws extending axially through the motor and end bell means 46, 48.

With the above description in mind, it will be appreciated that the assembly of the motor 10 may be quickly accomplished by stacking the parts thereof together and then rigidly fastening the parts together by means such as the screws 140, washers 142 and nuts 144. The stacking operation will center and preload the bearings 68, 70, position and hold the stator members 22, 24 and position and hold the brushes 126, 128.

The illustrative motor is a direct current motor of the type which may be used in automotive applications and particularly for driving blower wheels used in ventilation of automobiles. Flats 14 are provided on each end of the shaft 12 so that the motor 10 can be used to drive two separate blower wheels.

What is claimed is:

1. A motor comprising a rotor assembly including an elongated shaft and an armature assembly mounted on said shaft intermediate its ends, stator means disposed about said armature assembly, and housing means including an axially extending cylindrical shell enclosing said stator means, the ends of said shell lying in planes generally perpendicular to the axis of said shaft, end bell means for closing each end of said shell and journal mounting said shaft, each end bell means including a peripherally extending axially inner piece and a mating peripherally extending axially outer piece, means for fastening said pieces and said shell together, each inner piece engaging the adjacent end of said shell, and each outer piece engaging its mating inner piece along a plane generally perpendicular to the axis of said shaft, and a bearing for each end of said shaft, said mating outer and inner pieces capturing and supporting therebetween one of said bearings.

2. The motor of claim 1 in which each end bell means is constructed such that one of its said pieces provides a concentric seat for one axial end of its associated bearing and the other of its said pieces provides radially inwardly extending portions for engaging the opposite end of said bearing.

3. The motor of claim 1 in which each end bell means is constructed such that one of its said pieces provides a concentric rigid seat for one axial end of its associated bearing and the other of its said pieces provides radially inwardly extending yieldable portions for engaging the axially opposite end of said bearing and urging said bearing into said seat.

4. The motor of claim 3 in which each said bearing is concentrically beveled at its axial ends, said seat being formed conformingly to receive said one end of said bearing and said yieldable portions being tapered conformingly to engage the said opposite end.

5. The motor of claim 1 in which each end bell means is constructed such that its outer piece provides an axially inwardly facing rigid seat for one axial end of its associated bearing and its inner piece provides radially inwardly extending yieldable fingers for engaging the axially opposite end of said bearing and holding said bearing into said seat.

6. The motor of claim 1 in which one of said end bell means is constructed such that one of its pieces provides a pair of generally radially inwardly extending slots and the other of its pieces provides generally radially extending covers for said slots, said armature assembly including a commutator in registry with said slots, brushes disposed respectively in said slots for generally radial reciprocation therein, and spring means urging said brushes inwardly to contact said commutator.

7. The motor of claim 5 in which one of said end bell means is constructed such that one of its pieces provides a pair of generally radially inwardly extending slots and the other of its pieces provides generally radially extending covers for said slots, said armature assembly including a commutator in registry with said slots, brushes disposed respectively in said slots for generally radial reciprocation therein and spring means urging said brushes inwardly to contact said commutator.

8. The motor of claim 1 in which said end bell means are plastic and one of said end bell means is constructed such that its inner piece provides a pair of generally radially inwardly extending slots having generally rectangular cross sections and its outer piece provides a generally radially extending cover for each of said slots, said armature assembly including a commutator in registry with said slots, brushes having generally rectangular cross sections disposed respectively in said slots for generally radial reciprocation therein, and spring means urging said brushes inwardly to contact said commutator.

9. A motor comprising a rotor assembly including an elongated shaft and an armature assembly mounted on said shaft intermediate its ends, stator means disposed about said armature assembly, and housing means including an axially extending cylindrical shell enclosing said stator means, the ends of said shell lying in planes generally perpendicular to the axis of said shaft, and end bell means for closing each end of said shell and journal mounting said shaft, each end bell means including a peripherally extending axially inner piece and a mating peripherally extending axially outer piece, each inner piece engaging the adjacent end of said shell, and each outer piece engaging its mating inner piece along a plane generally perpendicular to the axis of said shaft, said stator means including a pair of cylindrically formed rubberlike members impregnated with magnetic material and extending about a portion of said armature assembly, said inner pieces being formed to provide axially inwardly extending portions for engaging and positioning said members in said shell.

10. The motor of claim 9 in which the axially extending edges of said members define two radially oppositely disposed, axially extending spaces adjacent the internal wall of said shell, said inwardly extending portions of each inner piece including two radially oppositely disposed pairs of fingers extending respectively into the adjacent ends of said spaces, each pair of said fingers being peripherally spaced apart to engage respectively the opposing axially extending edges of said members.

11. The motor of claim 9 in which one of said end bell means is constructed such that one of its pieces provides a pair of generally radially inwardly extending slots and the other of its pieces provides generally radially extending covers for said slots, said armature assembly including a commutator in registry with said slots, brushes disposed respectively in said slots for generally radial reciprocation therein, and spring means urging said brushes inwardly to contact said commutator.

12. The motor of claim 11 in which each said bell means is constructed such that one of its said pieces provides a concentric rigid seat for one axial end of its associated bearing and the other of its said pieces provides radially inwardly extending yieldable portions for engaging the axially opposite end of said bearing and urging said bearing into said seat.

13. A motor comprising a rotor assembly including an elongated shaft and an armature assembly mounted on said shaft intermediate its ends, stator means disposed about said armature assembly, and housing means including an axially extending cylindrical shell enclosing said stator means, the ends of said shell lying in planes generally perpendicular to the axis of said shaft, end bell means for closing each end of said shell and journal mounting said shaft, at least one of said end bell means including a peripherally extending axially inner piece and a mating peripherally extending axially outer piece, means for fastening said pieces and said shell together, said inner piece engaging the adjacent end of said shell, and said outer piece engaging its mating inner piece along a plane generally perpendicular to the axis of said shaft, and bearings for said shaft, said mating outer and inner pieces captured and supporting therebetween one of said bearings.

14. The motor of claim 13 in which said end bell means is constructed such that one of its said pieces provides a concentric seat for one axial end of its associated bearing and the other of its said pieces provides radially inwardly extending portions for engaging the opposite end of said bearing.

15. A motor comprising a rotor assembly including an elongated shaft and an armature assembly mounted on said shaft intermediate its ends, stator means disposed about said armature assembly, and housing means including an axially extending cylindrical shell enclosing said stator means, the ends of said shell lying in planes generally perpendicular to the axis of said shaft, and end bell means for closing each end of said shell and journal mounting said shaft, at least one of said end bell means including a peripherally extending axially inner piece and a mating peripherally extending axially outer piece, said inner piece engaging the adjacent end of said shell, and said outer piece engaging its mating inner piece along a plane generally perpendicular to the axis of said shaft, said end bell means being constructed such that one of its pieces provides a pair of generally radially inwardly extending slots and the other of its pieces provides generally radially extending covers for said slots, said armature assembly including a commutator in registry with said slots, brushes disposed respectively in said slots for generally radial reciprocation therein, and spring means urging said brushes inwardly to contact said commutator.

16. The motor of claim 13 in which said end bell means is plastic and formed such that its inner piece provides a pair of generally radially inwardly extending slots having generally rectangular cross sections and its outer piece provides a generally radially extending cover for each of said slots, said armature assembly including a commutator in registry with said slots, brushes having generally rectangular cross sections disposed respectively in said slots for generally radial reciprocation therein, and spring means urging said brushes inwardly to contact said commutator.

17. The motor of claim 13 in which said stator means includes a pair of cylindrically formed members extending about a portion of said armature assembly, said inner piece being formed to provide axially inwardly extending portions for engaging and positioning said members in said shell.

* * * * *